United States Patent
Mayatskikh et al.

(10) Patent No.: US 10,831,394 B2
(45) Date of Patent: Nov. 10, 2020

(54) LIVE UPGRADE OF STORAGE DEVICE DRIVER USING SHIM APPLICATION

(71) Applicant: International Business Machines Corporation, Armonk, NY (US)

(72) Inventors: Vitaly Mayatskikh, Ashland, MA (US); Rafael Velez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/113,532

(22) Filed: Aug. 27, 2018

(65) Prior Publication Data

US 2020/0065021 A1 Feb. 27, 2020

(51) Int. Cl.
*G06F 3/06* (2006.01)

(52) U.S. Cl.
CPC ............ *G06F 3/0647* (2013.01); *G06F 3/061* (2013.01); *G06F 3/0604* (2013.01); *G06F 3/0632* (2013.01); *G06F 3/0673* (2013.01)

(58) Field of Classification Search
CPC ............... G06F 1/00–3296; G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2206/00–20; G06F 2209/00–549; G06F 2211/00–902; G06F 2212/00–7211; G06F 2213/00–4004; G06F 2216/00–17; G06F 2221/00–2153; G06F 2201/00–885
See application file for complete search history.

(56) References Cited

U.S. PATENT DOCUMENTS

| | | | | |
|---|---|---|---|---|
| 5,696,897 A | * | 12/1997 | Dong | G06F 9/4418 713/2 |
| 7,392,527 B2 | * | 6/2008 | Callender | G06F 9/4411 719/327 |
| 7,508,532 B2 | | 3/2009 | Lawrence | |
| 7,587,724 B2 | * | 9/2009 | Yeap | G06F 21/554 719/328 |
| 7,640,553 B2 | | 12/2009 | Zimmer et al. | |
| 8,056,072 B2 | | 11/2011 | Andrews et al. | |
| 8,438,315 B1 | | 5/2013 | Tao et al. | |

(Continued)

OTHER PUBLICATIONS

Driver porting: the gendisk interface; corbet; Mar. 19, 2003; retrieved from https://lwn.net/Articles/25711/ on Mar. 30, 2020 (Year: 2013).*

(Continued)

*Primary Examiner* — Daniel C. Chappell
(74) *Attorney, Agent, or Firm* — Robert J. Shatto

(57) ABSTRACT

A first driver may register with a shim application that is disposed between a kernel block subsystem and the first driver. The first driver may suspend its IO requests upon being unloaded. The first driver may pass internal objects to the shim as one or more pointers. The first driver may deregister from the shim. A second driver may register with the shim. The IO requests may resume using the second driver.

19 Claims, 7 Drawing Sheets

(56) References Cited

U.S. PATENT DOCUMENTS

| | | | | |
|---|---|---|---|---|
| 8,447,894 B2* | 5/2013 | Chen | ............... | G06F 3/0607 710/17 |
| 8,582,139 B2* | 11/2013 | Metz | ............... | G06F 9/4411 358/1.15 |
| 8,819,383 B1* | 8/2014 | Jobanputra | ............... | G06F 3/0638 711/201 |
| 9,063,756 B2* | 6/2015 | Ben-Shaul | ............... | G06F 3/0484 |
| 9,519,600 B2* | 12/2016 | Lupu | ............... | G06F 9/4411 |
| 9,678,685 B1* | 6/2017 | Coffing | ............... | G06F 3/065 |
| 9,886,265 B2 | 2/2018 | Coffing et al. | | |
| 2003/0233487 A1* | 12/2003 | Ruget | ............... | G06F 9/4411 719/321 |
| 2004/0098714 A1* | 5/2004 | Metz | ............... | G06F 9/4411 717/168 |
| 2004/0216141 A1* | 10/2004 | Shoji | ............... | G06F 9/4411 719/321 |
| 2005/0149947 A1* | 7/2005 | Callender | ............... | G06F 9/4411 719/321 |
| 2005/0166094 A1* | 7/2005 | Blackwell | ............... | G06F 11/3664 714/38.14 |
| 2012/0284432 A1* | 11/2012 | Chen | ............... | G06F 3/0607 710/17 |
| 2013/0067274 A1* | 3/2013 | Huang | ............... | G06F 13/12 714/6.22 |
| 2015/0248285 A1 | 9/2015 | Kang et al. | | |
| 2016/0006789 A1* | 1/2016 | Silbey | ............... | G06F 8/65 709/203 |
| 2016/0210080 A1* | 7/2016 | Frank | ............... | G06F 3/061 |
| 2016/0266894 A1* | 9/2016 | Panicker | ............... | G06F 8/656 |

OTHER PUBLICATIONS

H. Tanaka, Y. Nomura and H. Taniguchi, "Run-time Updating of Network Device Drivers," 2009 International Conference on Network-Based Information Systems, Indianapolis, IN, 2009, pp. 446-450 (Year: 2009).*

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

LIVE UPGRADE OF STORAGE DEVICE DRIVER USING SHIM APPLICATION

BACKGROUND

The present disclosure relates generally to the field of computer storage system, and more particularly to performing a live upgrade of a storage device driver using a shim application.

Computers store data using various architectures. For example, some computer systems store data using file-level storage, also referred to as file-based storage, using a filesystem. Other computer systems store data as objects in an object storage system. Object storage systems can be operated within a distributed computing environment (e.g., in a cloud-based system) where host devices store their data remotely. Computing devices often communicate with the underlying storage hardware (e.g., hard disk drives) using storage drivers.

SUMMARY

Embodiments of the present disclosure include a method, system, and computer program product for performing a live upgrade of a storage driver using a shim application. A first driver may register with a shim application that is disposed between a kernel block subsystem and the first driver. The first driver may suspend its IO requests upon being unloaded. The first driver may pass internal objects to the shim as one or more pointers. The first driver may deregister from the shim. A second driver may register with the shim. The IO requests may resume using the second driver.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
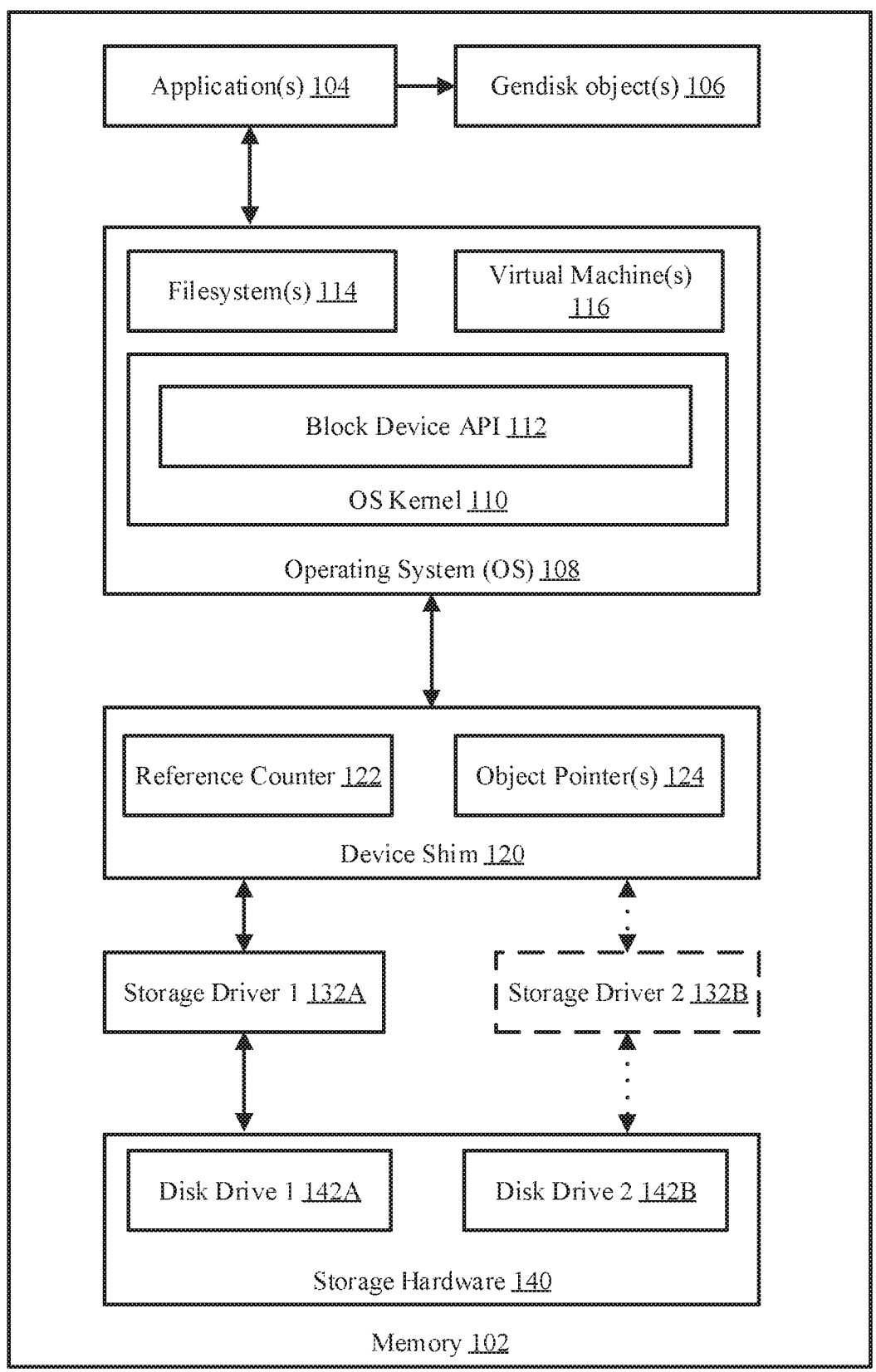
FIG. 1 illustrates an example memory subsystem of a computing device, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer storage systems, and more particularly to performing a live upgrade of a storage device driver using a shim application. While the present disclosure is not necessarily limited to such applications, various aspects of the disclosure may be appreciated through a discussion of various examples using this context.

Usually, storage systems have a low-level kernel driver that acts as bridge between storage hardware (disk controller, protocol implementation) and common block device API implemented in an operating system (OS) kernel. It is often desirable to have a longest possible service time of a storage system in production between maintenance. Even further, some storage systems do not support a maintenance mode—they always need to be redeployed from scratch when a new storage driver is installed. However, software products that are still under active development, including drivers, require regular software updates to apply bug fixes or to bring in a new feature. In general, unloading an old version of the driver and loading a new version is impossible without detaching all clients (file systems, virtual machines) that are using services provided by the driver. Thus, a regular upgrade path is disruptive, requiring components of the system to be shut down. Accordingly, the inventors recognized a need for a method for performing a non-disruptive (i.e., live) block device driver upgrade.

According to some embodiments, a shim module acts as a proxy for the gendisk API. The shim sits between the kernel block subsystem layer and the low-level driver (LLD). Upon load, a LLD registers itself in the shim as an engine for gendisk API. When a disk that is created by the LLD is opened by a system component, such as by a virtual machine or application, the shim module gets charged with a reference count, unlike traditional systems that charged the reference count to the LLD itself.

Because the LLD is not charged with opened disks, nothing holds LLD from unloading, whereas in traditional systems, the operating system would not allow the LLD to unload until all attached/opened disks are closed and the reference count for the LLD is 0. The LLD suspends all block device IO queues so that no new IO requests may be sent to the LLD. It also cancels timers and flushes deferred activity. Internal objects that have to persist over upgrade (e.g., that will be used by the new LLD), are passed to the shim as a cookie pointer to a memory area where these objects are located. In this way, gendisk-related objects are not destroyed. The rest of objects are freed normally. The LLD module de-registers from the shim (but shim saves the cookie) and then unloads.

The new LLD module is then loaded. It registers in the shim, retrieves cookie(s) saved by the old LLD, restores the operational state from the old objects contained/referenced in a memory behind cookie pointer(s), walks through the list of existing block devices served by the old version, recovers them, and resumes block device queues. Upon resuming the block device queues, IO continues to flow, now being directed to the new LLD. The LLD upgrade and engine reload remains mostly unnoticed by the block device users (e.g., file systems, virtual machines), as they may only see an unexpected latency spike for the longevity of upgrade operation, which is a matter of seconds and usually is not critical in a typical cloud environment that normally have to tolerate longer IO outages.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates an example memory subsystem 102 of a computing device, in accordance with embodiments of the present disclosure. The memory subsystem 102 includes one or more applications 104, one or more gendisk objects 106, an operating system (OS) 108, a device shim (also referred to herein as a "shim application" or just a "shim"), storage driver(s) 132A and B (individually referred to as a storage driver 132), and storage hardware 140. Other components not shown in FIG. 1 may be installed in the memory subsystem, such as other drivers. Additionally, while the storage driver 132 and the storage hardware 140 is shown as being within the memory subsystem 102, in some embodiments the memory subsystem may include dynamic storage (e.g., DRAM) and cache, and the computing device may include a separate persistent storage subsystem that include the storage hardware 140 and storage driver 132.

The OS 108 includes one or more filesystems 114, one or more virtual machines (VMs) 116, and an OS kernel 110. The OS kernel 110 may include a set of software that acts to enable communication (e.g., in the form of system calls) between the application(s) 104 and the lower level hardware, such as the CPU, memory hardware, and I/O devices. Accordingly, the OS kernel 110 may include numerous application programming interfaces (APIs) to enable application to communicate with specific components. For example, the OS kernel 110 includes a block device API 112 to enable the applications 104 to communicate with the storage hardware 140 via the shim 120 and the storage driver 132. While the application(s) 104 is shown as being communicatively coupled to, but outside of, the OS 108, in some embodiments, one or more of the application(s) 104 may be run from within the OS 108. Likewise, while the application(s) 104 is shown as being outside of the VM(s) 116, in some embodiments, one or more of the application(s) 104 may be run from within the VM(s) 116.

The shim 120 sits between the OS 108 and the storage driver 132. The shim 120 is loaded with the OS 108, and passes calls received from the OS 108 to the storage driver 132. In some embodiments, the shim 120 is a light program capable of binding itself to the disks based on the disk type and handle open/close operations with respect to disks and pass these calls to the storage driver 132 where they are actually implemented; however, the shim device may not include any additional logic for processing I/O requests or performing other operations typically handled by the storage driver 132.

The shim 120 is associated with a gendisk object representing a disk, the gendisk object includes a reference counter 122. The reference counter keeps a running tally of the number of disks opened by various clients running on the system. For example, if a filesystem 114 or VM 116 opens a disk, the shim 120 is credited with the opened disk and the reference counter 122 is incremented. Similarly, when a filesystem 114 or VM 116 closes a disk, the reference counter 122 is decremented. The shim also includes one or more object pointers 124. The object pointer(s) 124, also referred to herein as cookie pointers or just pointers, are pointers passed from a first storage driver (e.g., storage driver 132A) to the shim during the live migration of the first storage driver to a second storage driver (e.g., storage driver 132B). The pointers refer to the objects that are going to persist and be picked up by the second storage driver, such as the gendisk object(s) 106, LLD-specific representations of a disk drive, network-related objects or virtual function tables that have to stay in the same memory area as long as the disk exists in the system.

The storage hardware 140 may include one or more persistent storage devices. For example, as shown in FIG. 1, the storage hardware 140 can include a first hard disk drive 142A and a second hard disk drive 142B. As would be recognized by a person of ordinary skill in the art, the storage hardware 140 may include any number of storage devices, and the storage devices can include other types of storage device, such as solid-state drives.

As described herein, the gendisk object(s) 106 include references to memory objects that are created by the storage driver 132 when a disk (e.g., disk driver 142A) is opened. The gendisk object(s) 106 allow clients, such as filesystem 114, VM 116, and/or application 104, to attach to and access storage hardware 140.

In accordance with some embodiments of the present disclosure, during system startup, the OS 108 and the device shim 120 may be loaded into memory. The OS 108 may further load the filesystems 114 and virtual machines 116. Additionally, the first storage driver 132A may be loaded. Upon loading, the first storage driver 132A may register with the shim 120. Responsive to clients (e.g., a VM 116) opening a disk (e.g., disk drive 142A), a gendisk object 106 may be generated by the first storage driver 132A. Additionally, the reference counter 122 may be incremented. The reference counter 122 may continue to be incremented each time a client opens a disk and decremented each time a disk is closed.

Upon a request to load a new storage driver 132B, the first storage driver 132A may send a set of object pointers 124 to the shim 120. Each object pointer 124 may reference an object in the memory (e.g., a gendisk object 106) associated with the first storage driver 132A that is to persist through the live migration. Additionally, the first storage driver 132A may suspend its block device queues (not shown), cancel its timers, and flush its deferred activity. The first storage driver 132A may then release its remaining objects, de-register from the shim 120, and be removed from memory.

A new storage driver 132B may be loaded into memory. The new storage driver 132B may register with the shim 120 and restore its operational state using internal objects. The new storage driver 132B may receive, from the shim 120, the set of points 124. Using the pointers 124, the new storage driver 132B may recover block devices and resume the block device queues.

Figure 2:
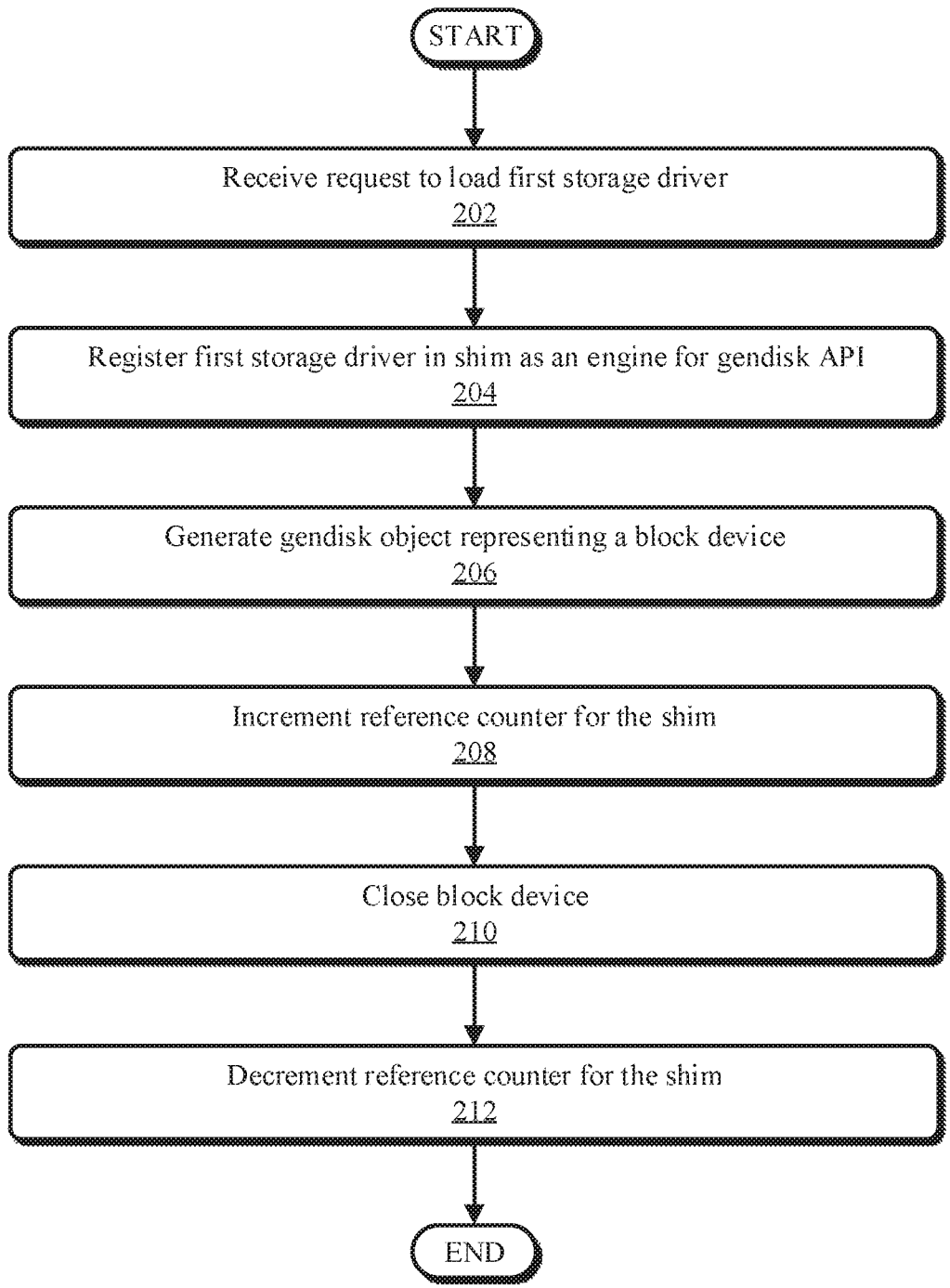
FIG. 2 illustrates a flowchart of an example method for generating and closing disk objects associated with block devices using a shim application, in accordance with embodiments of the present disclosure.

Referring now to FIG. 2, illustrated is a flowchart of an example method 200 for generating and closing disk objects associated with block devices using a shim application, in accordance with embodiments of the present disclosure. In some embodiments, the method 200 may be performed by a processor executing a shim application. In some embodiments, the shim application may be embodied entirely as hardware, entirely as software/firmware, or as a combination of hardware and software/firmware. The method 200 may begin at operation 202, where the shim application may receive a request to load a first storage driver.

As described herein, a storage driver is a type of device driver that operates or controls hardware storage devices (e.g., hard disk drives, solid-state drives) attached to a computer system. The storage driver provides a software interface to the hardware storage devices, allowing operating systems and other applications running on the computer system to access the hardware without needing to know precise details about how the hardware operates.

In some embodiments, the shim application may receive a request to load the first storage driver during startup of the computer system. In other words, during startup of the computer system, the shim application may be loaded into the computer's memory. After the shim application is loaded, the operating system (or BIOS) may load the first storage driver. In some embodiments, the operating system instructs the shim application to load the first storage driver. In other embodiments, the operating system loads the first storage driver on its own. In still other embodiments, the shim application loads the first storage driver automatically.

After receiving the request to the first storage driver at operation 202, the shim application registers the first storage driver as an engine for the gendisk application programming interface (API). Gendisk API lays at the core of Linux block subsystem. All the internal knowledge about particular disk and methods of accessing it, (e.g., function pointers to read/write operations) is contained in a gendisk object. The OS works with all kinds and types of disks via gendisk objects and its API, while LLD contains implementation of these APIs for specific kind or type of disk or disk controller, e.g. iSCSI disk, or NVMe disk or logical volume. While gendisk objects and gendisk APIs as found in Linux systems are discussed in detail herein, a person of ordinary skill in the art would recognize that other operating systems have functionally similar objects and APIs for handling device drivers. The use of gendisk herein is for illustrative purposes only, and the present disclosure should not be limited to any particular operating system or environment.

Responsive to the first storage driver binding to a gendisk object to represent a block device (e.g., a disk drive that is attached) at operation 206, a reference counter for the shim application is incremented at operation 208. Accordingly, the shim application, as opposed to the first storage driver, is associated with the gendisk object. Similarly, if a block device is closed at operation 210, the reference counter for the shim is decremented at operation 212.

Because the first storage driver is not credited with the gendisk object, the operating system allows the first storage driver to be removed (e.g., unloaded) from the system without first disconnecting all of the attached block devices.

Figure 3A:
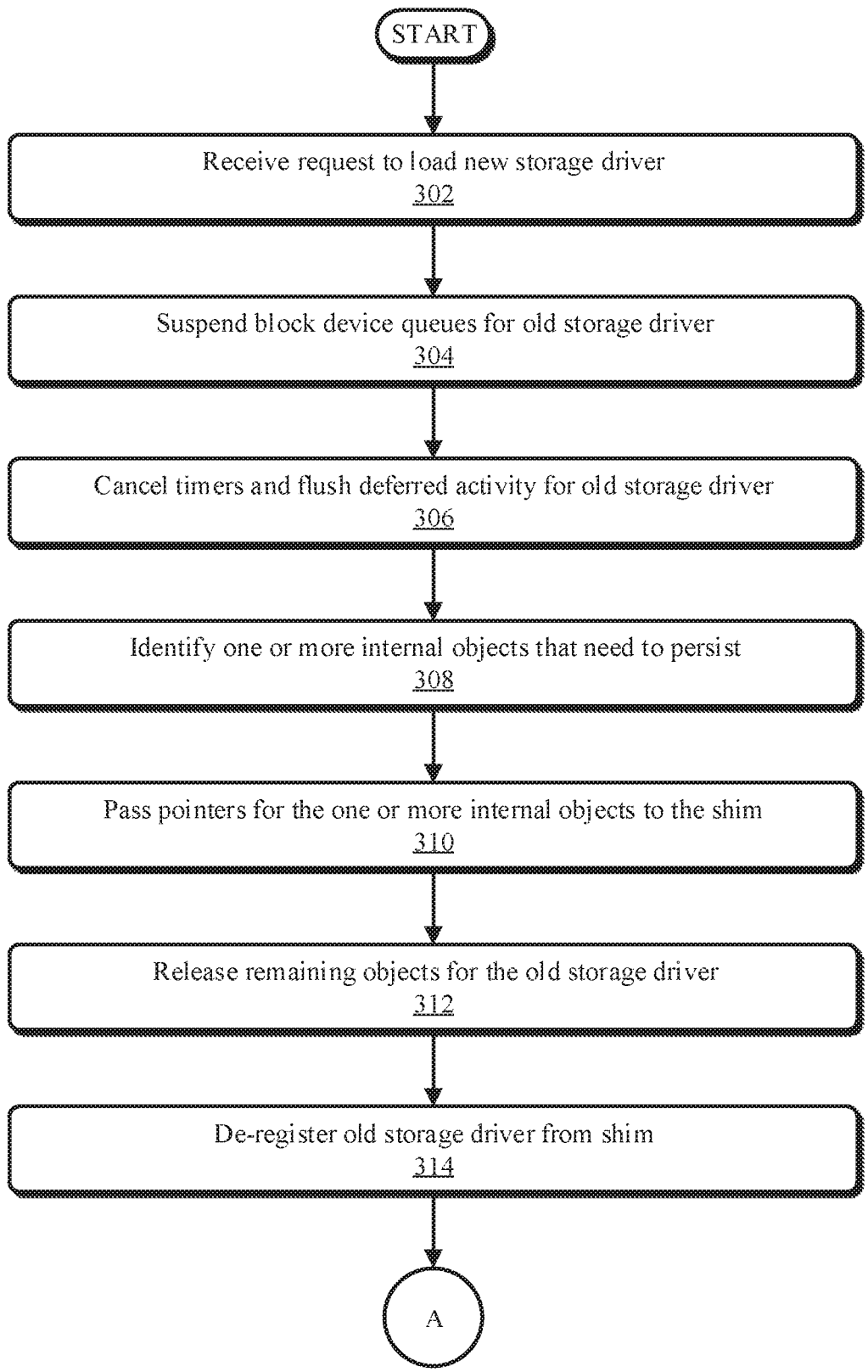
FIGS. 3A and 3B illustrate a flowchart of an example method for performing a live upgrade of a storage driver using a shim application, in accordance with embodiments of the present disclosure.
Figure 3B:
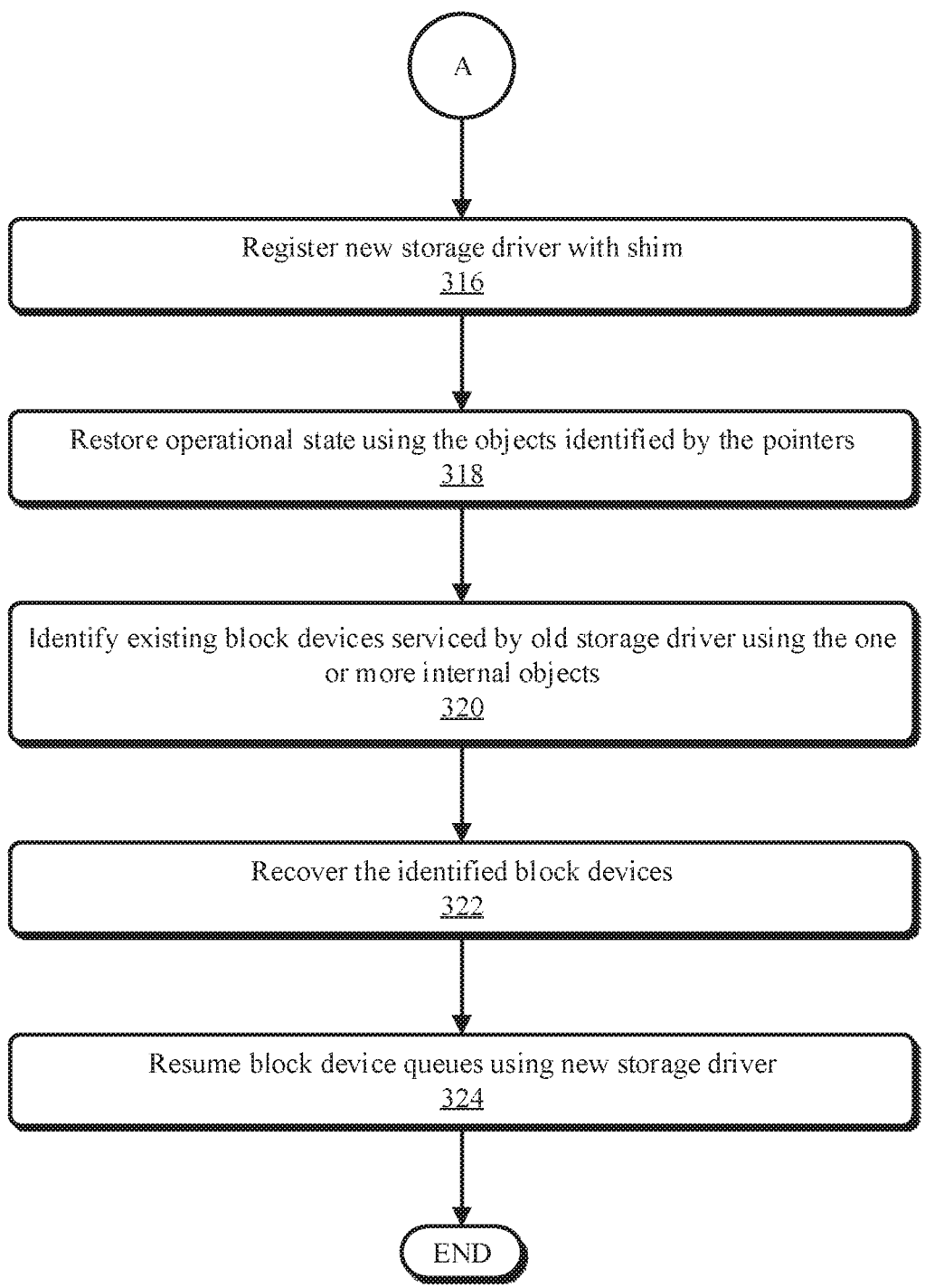

Referring now to FIGS. 3A and 3B, illustrated is a flowchart of an example method 300 for performing a live upgrade of a storage driver using a shim application, in accordance with embodiments of the present disclosure. Specifically, the operations shown in FIG. 3A may be performed to suspend I/O commands and unload an old storage driver, and the operations shown in FIG. 3B may be performed to load a new storage driver and resume I/O commands. In some embodiments, the method 300 may be performed by a processor executing a shim application. In some embodiments, the shim application may be embodied entirely as hardware, entirely as software/firmware, or as a combination of hardware and software/firmware. The method 300 may begin at operation 302, where the shim application may receive a request to load a new storage driver.

In some embodiments, the request to load a new storage driver may be received by the shim application and from the operating system. The request to load a new storage driver may be initiated by a user, by an application, by the operating system, or by the old storage driver itself (e.g., upon determining that an update is available). In some embodiments, the shim application may decide to load a new storage driver in response to an attempt to install the new storage driver on the computer system.

Responsive to receiving the request to load the new storage driver at operation 302, the old storage driver may suspend block device queues at operation 304. Individual requests/commands in the block device queues (e.g., to retrieve data) may be maintained, but are not executed during the live upgrade. Additionally, new requests generated by applications running on the computer system may continue to be accumulated in the OS as the applications may be unaware that the old storage driver is being unloaded. These accumulated requests can be executed when the new storage driver is loaded.

At operation 306, the old driver may cancel timers and flush deferred activity for the old storage driver. Since the memory behind the old driver will be unloaded soon, no calls can be made into now gone memory without triggering a memory protection fault in CPU in some embodiments. Accordingly, canceling the timers and flushing the deferred activity can prevent the memory protection fault from occurring during the live migration to a new driver.

At operation 308, the old drive may identify one or more internal objects (e.g., gendisk objects) that need to persist. For example, the old driver may identify a plurality of objects associated with virtual machines or filesystems attached to the computer system via the old storage driver. The old driver may determine that one or more of the objects, such as objects associated with commands in the block device queues, will continue to be used after the new storage driver is loaded. In some embodiments, the old storage device or the operating system may determine which internal objects need to persist.

Pointers for the one or more internal objects that need to persist may be passed to the shim application at operation 310. The shim application may store these pointers in its own memory space, in registers, or in the general memory of the computer system.

At operation 312, remaining objects for the old storage driver are released. Objects that are going to persist are kept in memory, while objects that will not persist are removed from memory (e.g., from a heap) and the associated memory is freed up for use by other applications. After the objects are released at operation 312, the old storage driver is de-registered from the shim application at operation 314 and the old storage driver is unloaded (e.g., removed from memory).

At operation 316, the new storage driver is loaded and registers with the shim application. In some embodiments, the new storage driver may be loaded (e.g., placed into memory) while the old storage driver is being released, but left in a non-operational state such that the OS does not send any I/O requests or commands to the new storage driver. Upon unloading the old storage driver, the new storage driver may then register with the shim application.

At operation 318, the operational state of the storage driver may be restored on the new storage driver using the one or more objects. For example, the application shim may transmit a list of pointers to the new storage driver. The new storage driver may then retrieve the objects using the pointers.

At operation 320, the shim application may identify existing block devices serviced by the old storage driver using the one or more internal objects (e.g., the gendisk objects). The shim application may then recover the identified block devices at operation 322. In some embodiments, recovering the identified block devices may include making the block devices operational.

At operation 324, the new driver may resume the block device queues. In addition, any I/O requests received by the OS after suspending the block device queue and before resuming the block device queues (e.g., any requests received during operations 306-322) may be transmitted to the new storage device. Once the block device queues are resumed, the method 300 may end.

The new driver carries knowledge of objects format (internal layout) used in the old driver. The new driver may need to recreate internal representation of various objects imported from the old driver, as necessary for the new code changes contained in the new driver. Because objects format is versioned, upgrade path in the new driver must know how to upgrade objects of specific older version to current version that is used in the new driver.

Figure 4:
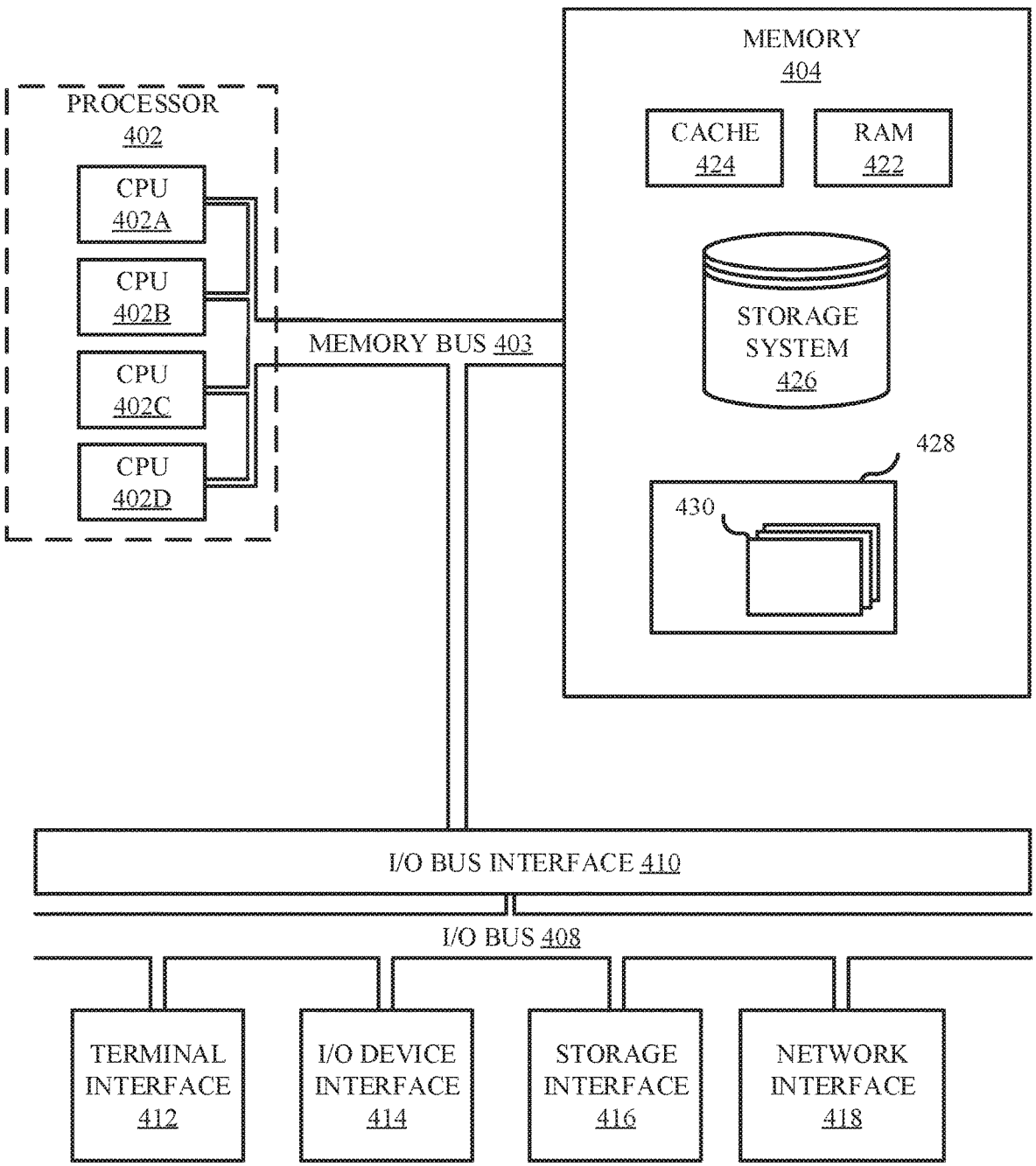
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
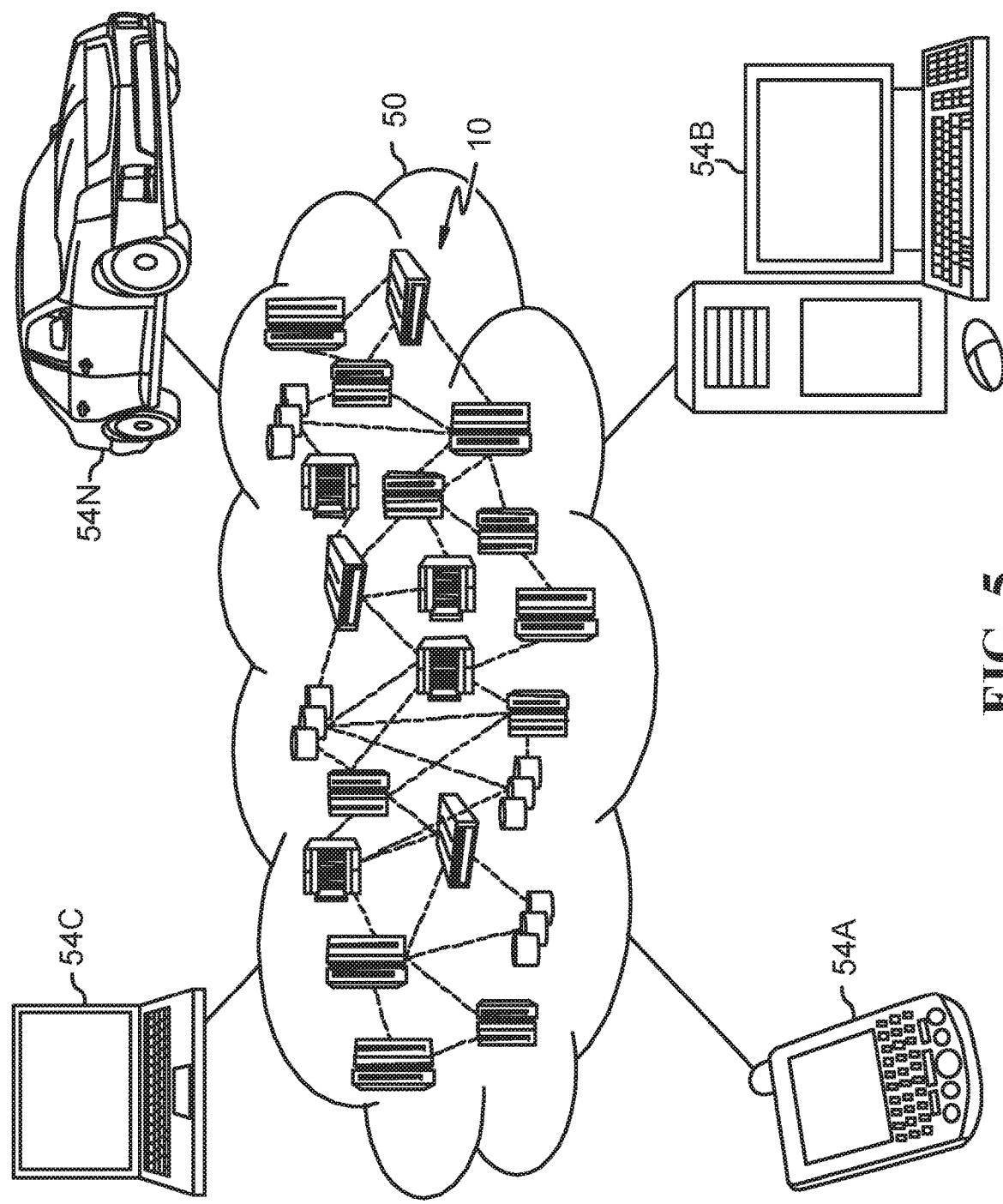
FIG. 5 depicts a cloud computing environment, in accordance with embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
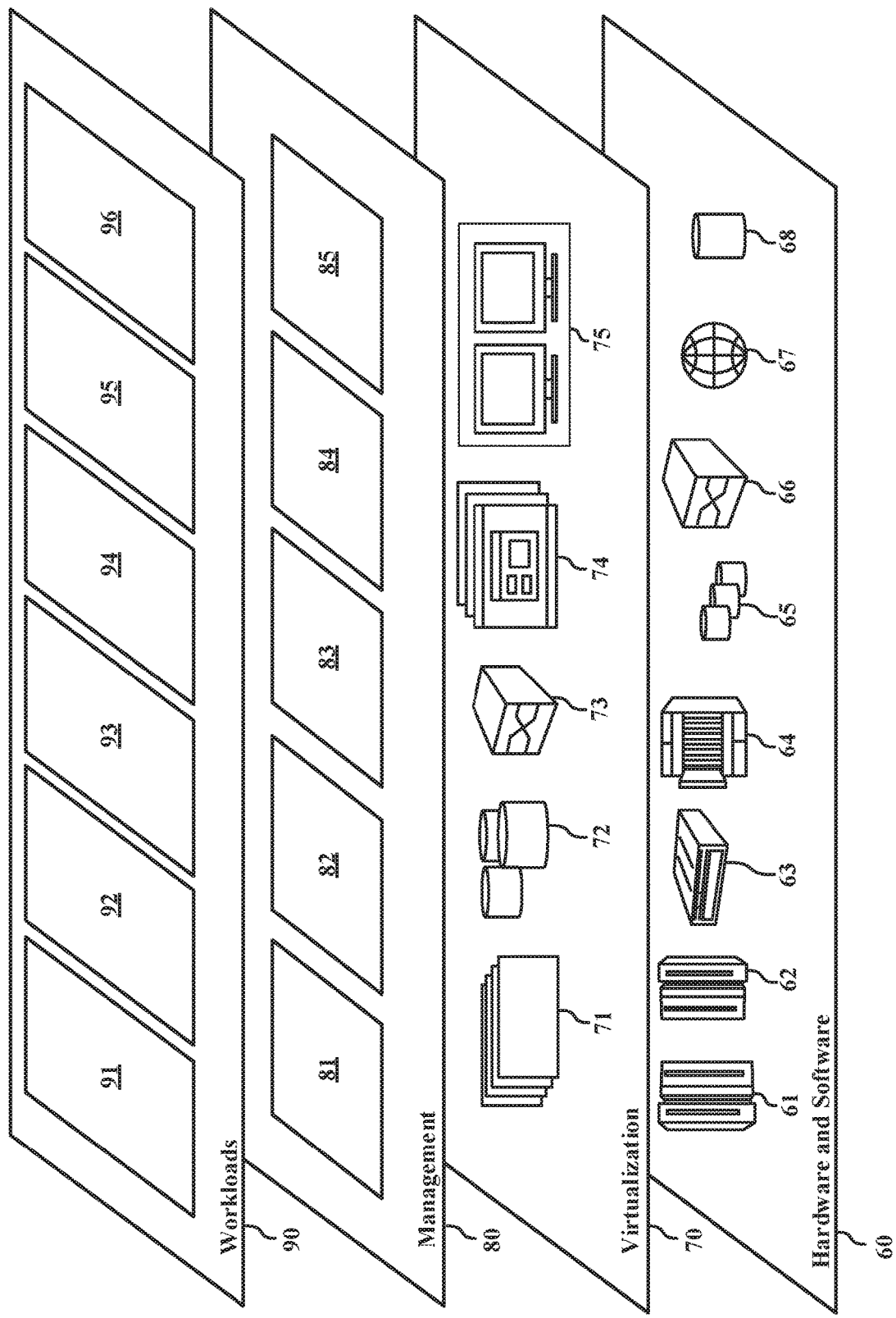
FIG. 6 depicts abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer-implemented method for performing a live migration of a storage driver, the method comprising:
   registering a first driver with a shim disposed between a kernel block subsystem and the first driver;
   maintaining a reference count for the shim that identifies how many open disks are charged against the shim;
   suspending, upon an unload of the first driver, Input/Output (IO) requests associated with the first driver;
   receiving, from the first driver, internal objects passed to the shim as one or more pointers;
   deregistering the first driver from the shim;
   registering a second driver with the shim;
   restoring, on the second driver, an operational state of the first driver using the internal objects; and
   resuming the IO requests using the second driver.

2. The method of claim 1, wherein the first driver registers with the shim during a loading of the first driver, and second driver registers with the shim during a loading of the second driver.

3. The method of claim 1, wherein each pointer in the one or more pointers references an internal object that is selected to persist through the live migration, wherein the one or more pointers are cookie pointers to a memory area whereat the internal objects are stored.

4. The method of claim 3, wherein resuming the IO requests using the second driver includes:
   retrieving, by the second driver, the one or more pointers from the shim; and
   restoring the internal objects.

5. The method of claim 1, the method further comprising:
   canceling, by the first driver and in response to a request to load a new driver, one or more timers;
   flushing, by the first driver, deferred activity for the first driver; and
   releasing, by the first driver and after passing internal objects to the shim as one or more pointers, any remaining objects.

6. The method of claim 5, wherein the internal objects passed to the shim are objects that are to persist through the live migration, and wherein the remaining objects are objects that are not to persist through the live migration.

7. The method of claim 1, wherein maintaining the reference count for the shim comprises:
   incrementing, in response to a system component opening a disk attached to a storage driver registered with the shim, the reference count; and
   decrementing, in response to the system component closing the disk, the reference count.

8. The method of claim 1, wherein the internal objects passed to the shim include a gendisk object that stores information related to device handling.

9. The method of claim 8, wherein the information in the gendisk object includes disk capacity of an associated disk attached via the first driver.

10. The method of claim 1, wherein restoring, by the second driver, the operational state comprises:
    retrieving the one or more pointers;
    walking through a list of existing block devices served by the first driver; and
    recovering the existing block devices.

11. A system for performing a live migration of a storage driver, the system comprising:
    a memory; and
    a processor communicatively coupled to the memory, wherein the processor is configured to perform a method comprising:

registering a first driver with a shim disposed between a kernel block subsystem and the first driver;

maintaining a reference count for the shim that identifies how many open disks are charged against the shim;

suspending, by the first driver during unloading, Input/Output (IO) requests;

passing, by the first driver, internal objects to the shim as one or more pointers, the internal objects being objects that store information related to an operational state of the first driver, the internal objects being stored in the memory;

deregistering the first driver from the shim;

registering a second driver with the shim;

restoring, by the second driver, the operational state using the internal objects; and resuming the IO requests using the second driver.

12. The system of claim 11, wherein the first driver registers with the shim during a loading of the first driver, and second driver registers with the shim during a loading of the second driver.

13. The system of claim 11, wherein each pointer in the one or more pointers references an internal object that is selected to persist through the live migration.

14. The system of claim 11, wherein the method performed by the processor further comprises:

canceling, by the first driver and in response to a request to load a new driver, one or more timers;

flushing, by the first driver, deferred activity for the first driver; and releasing, by the first driver and after passing internal objects to the shim as one or more pointers, any remaining objects.

15. The system of claim 11, wherein the second driver is an updated version of the first driver, and wherein the first driver is unloaded in response to determining that the updated version of the first driver is available.

16. A computer program product for performing a live migration of a storage driver, the computer program product comprising a computer readable storage medium having program instructions embodied therewith, the program instructions executable by a processor to cause the processor to perform a method comprising:

maintaining a reference count for a shim that identifies how many open disks are charged against the shim, wherein the open disks are attached to a first driver, and wherein the shim is disposed between a kernel block subsystem and the first driver;

suspending, by the first driver and responsive to the first driver unloading, Input/Output (IO) requests;

passing, by the first driver, internal objects to the shim as one or more pointers;

restoring, by a second driver, an operational state using the internal objects; and resuming the IO requests using the second driver.

17. The computer program product of claim 16, wherein the first driver registers with the shim during a loading of the first driver, and second driver registers with the shim during a loading of the second driver.

18. The computer program product of claim 16, wherein the method performed by the processor further comprises:

canceling, by the first driver and in response to a request to load a new driver, one or more timers;

flushing, by the first driver, deferred activity for the first driver; and releasing, by the first driver and after passing internal objects to the shim as one or more pointers, any remaining objects.

19. The computer program product of claim 18, wherein the internal objects passed to the shim are objects that are to persist through the live migration, and wherein the remaining objects are objects that are not to persist through the live migration.

* * * * *